United States Patent [19]
Bersson

[11] Patent Number: 6,081,897
[45] Date of Patent: Jun. 27, 2000

[54] APPARATUS FOR MONITORING AND PREVENTING UNAUTHORIZED COPYING OF DIGITAL DATA

[75] Inventor: Edward F. Bersson, McLean, Va.

[73] Assignee: Recording Industry of America, New York

[21] Appl. No.: 09/006,183

[22] Filed: Jan. 13, 1998

Related U.S. Application Data

[60] Provisional application No. 60/035,086, Jan. 13, 1997.

[51] Int. Cl.[7] .................................................. G11B 23/28
[52] U.S. Cl. ................................. 713/200; 380/3; 380/4; 380/5; 711/4; 711/154; 711/163
[58] Field of Search ................................. 713/200; 711/4, 711/154, 163; 380/3, 4, 5, 203, 200; 705/57

[56] References Cited

U.S. PATENT DOCUMENTS

| | | | |
|---|---|---|---|
| 5,177,618 | 1/1993 | Dunlap et al. | 358/335 |
| 5,208,679 | 5/1993 | Yamauchi et al. | 358/342 |
| 5,295,187 | 3/1994 | Miyoshi | 380/4 |
| 5,513,260 | 4/1996 | Ryan | 380/3 |
| 5,574,787 | 11/1996 | Ryan | 380/5 |
| 5,659,613 | 8/1997 | Copeland et al. | 380/3 |
| 5,896,454 | 4/1999 | Cookson et al. | 380/5 |

*Primary Examiner*—Robert W. Beausoliel, Jr.
*Assistant Examiner*—James G. Weir
*Attorney, Agent, or Firm*—Pollock Vande Sande & Amernick

[57] ABSTRACT

An apparatus for monitoring and preventing unauthorized copying of digital data. A recording device records digital data on a first storage medium which has been read from a second storage medium. A computer connected to said recording device and the reading device is programmed to execute premastering instructions to enable reading of data from a second storage medium in order to record the data on the first storage medium. The computer further includes instructions for inhibiting copying of the data when said data is subject to copyright by detecting a notice of copyright in the data and inhibiting the premastering instructions from reading the data which includes the copyright notice thereby preventing recording of the data on the first medium.

9 Claims, 3 Drawing Sheets

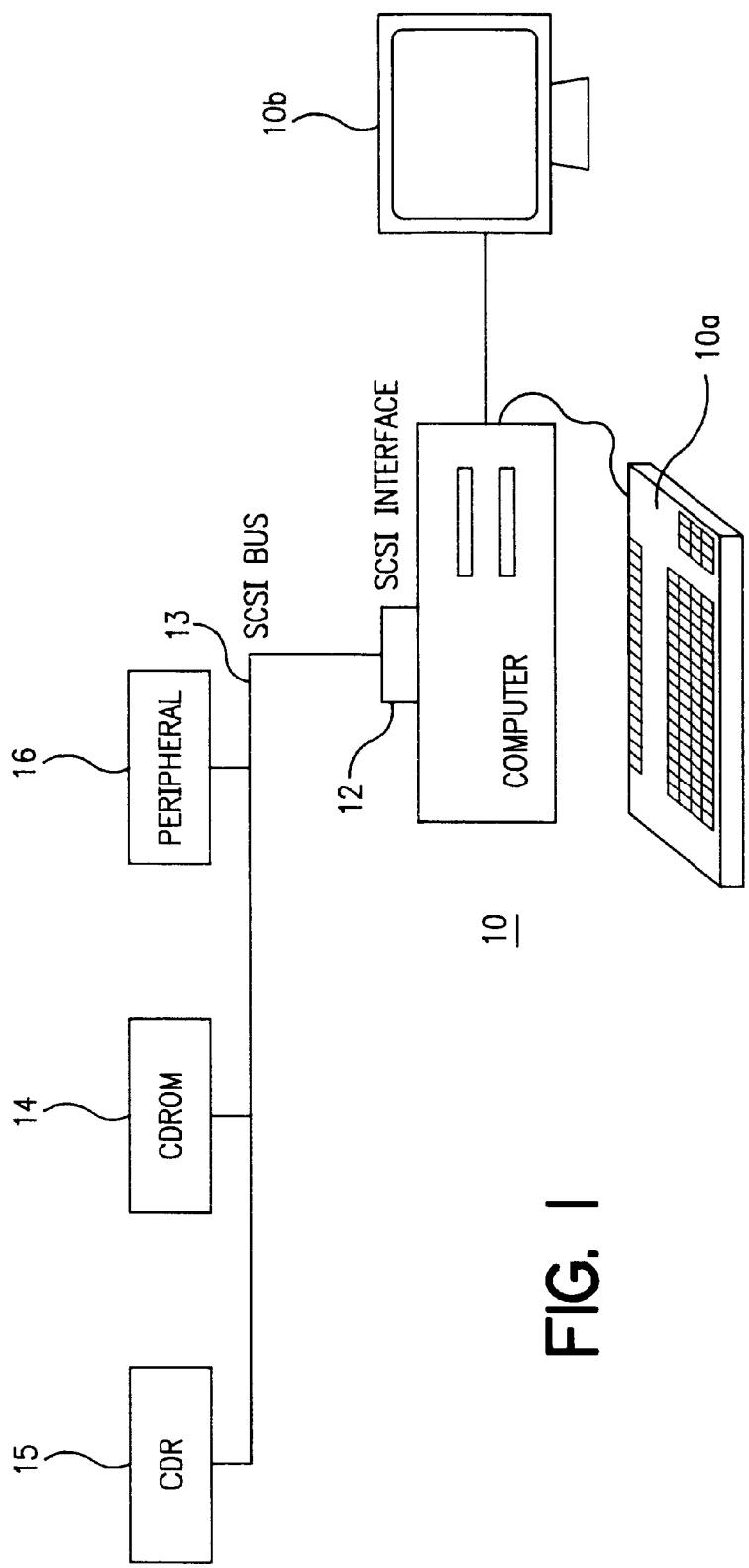
FIG. I

APPARATUS FOR MONITORING AND PREVENTING UNAUTHORIZED COPYING OF DIGITAL DATA

RELATED APPLICATIONS

The benefit of earlier Provisional Patent Application No. 60/035,086, filed in the name of the same inventor on Jan. 13, 1997 is claimed.

BACKGROUND OF THE INVENTION

The present invention relates to a system for preventing the unauthorized copying of compact discs containing prerecorded data. Specifically, a digital recording system is described which includes premastering software for preventing the recording of copyrighted information on a compact disc. Compact disc (CD) recorders along with user friendly premastering software are available for making copies of CD ROMS. This includes both digital data representing computer software stored on a compact disc, as well as audio sound recordings which are digitally recorded on a compact disc.

These systems may include a SCSI bus arrangement connected to multiple peripheral devices, one of which can read a compact disc, and another of which can write or create a compact disc from the read data. The SCSI bus peripherals are under control of a standard personal computer through a SCSI bus interface.

The availability of such hardware renders possible the mass infringement of copyrighted works. Recording technology has progressed to the point where in a time frame of between 20 and 40 minutes a complete compact disc could be reproduced from another prerecorded disc. In anticipation of such wide scale copyright infringement, the producers of sound recordings, as well as computer software, which are stored in a digital format on a compact disc have included for each track which is the subject of copyright protection, a copyright notice in the form of a flag contained within a control field of the track. It is contemplated that legitimate manufacturers of recording equipment will include a feature which will inhibit the recording of any track being read which contains the copyright notice.

The present invention represents one approach for controlling such unauthorized copying of a copyrighted work contained in a track of a CD.

SUMMARY OF THE INVENTION

It is an object of this invention to prevent unauthorized copying of works stored on a compact disc.

It is a more specific object of this invention to permit copying of works which may not be subject to copyright, and to inhibit the copying of works which are subject to copyright when read from the same compact disc.

These and other objects of the invention are provided by a recording system which is capable of reading an input disc containing works to be copied, and which records the works on a blank disc or other recording medium. The system will create a table of tracks identifying each track of a compact disc to be recorded with information about the track, including whether or not a flag serving as a copyright notice is contained in a control field of the track. Prior to issuing any command to read the track, the table is consulted, and reading of the track is inhibited when a copyright notice is present in the control field, thereby preventing recording of the track.

In carrying out the invention, premastering software may be provided which is capable of reading and recording tracks of an input compact disc. The premastering software includes a driver. The invention provides a second driver having a first routine to monitor the driver at a specific execution point of the driver to intercept commands issued by the premastering software, and detect whether or not a command to read a copyrighted CD track is being made. A second routine is also provided to intercept commands issued by the premastering software to build a table of tracks identifying each of the tracks of the input CD which is to be copied, and to identify any tracks containing a copyright notice.

During execution of the premastering software, any command to read a track from an input CD results in the first routine reading the table of tracks created in the second routine, to determine whether or not the track to be read included a copyright notice. In the event a copyright notice is present for the specific track, reading is inhibited preventing copying of the track, and a message is issued to the user that the copyright track cannot be read.

DESCRIPTION OF THE DRAWINGS

FIG. 1 is an illustration of a system for making copies of CD ROM and CD audio digital sound recordings.

DESCRIPTION OF THE PREFERRED EMBODIMENT

Figure 2A:
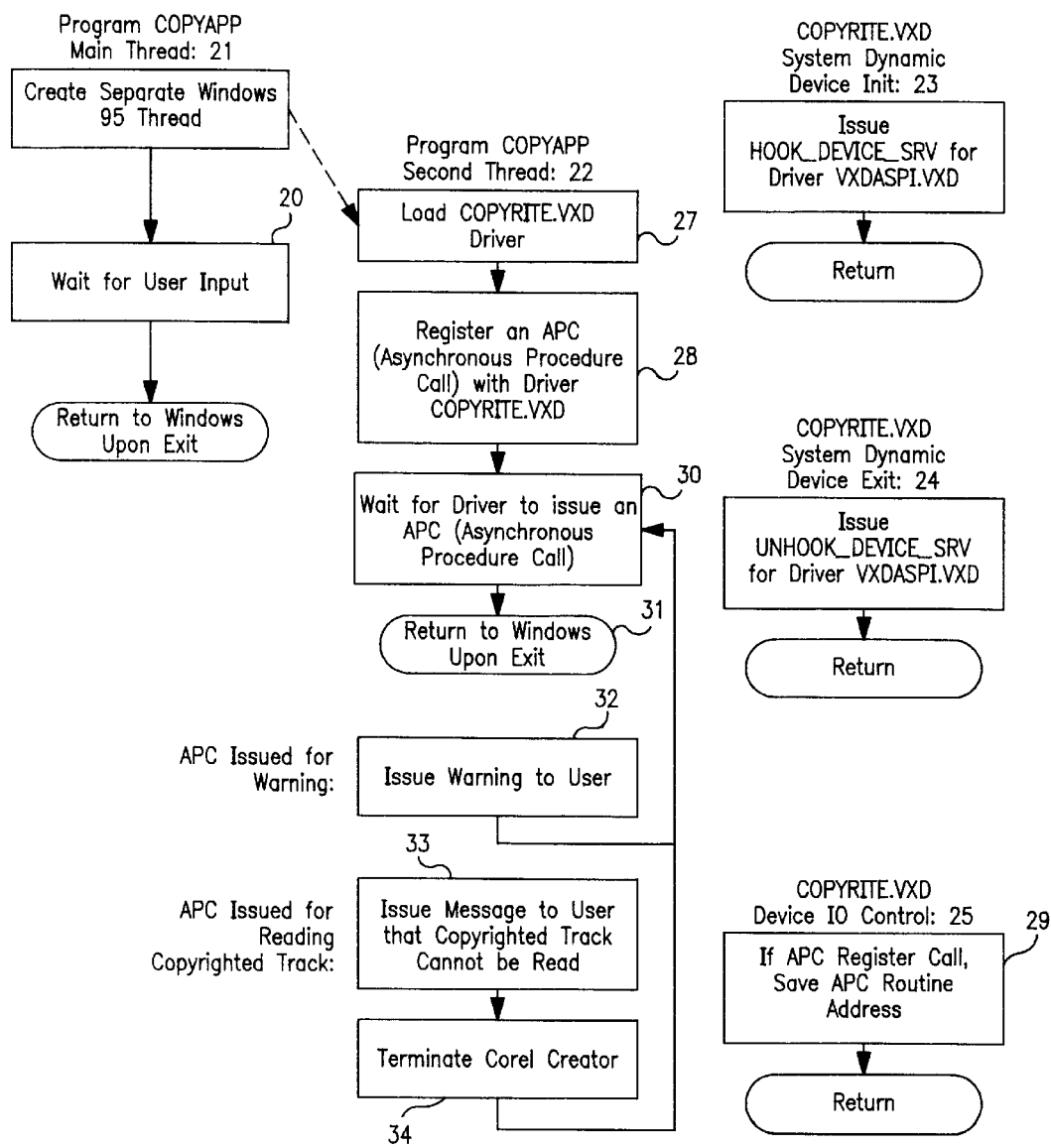
FIGS. 2A and 2B (hereinafter collectively referred to as FIG. 2) illustrates a flow chart of a driver for inhibiting copying of a disc containing a copyright notice.

FIG. 1 is a block diagram of one example of a recording system which permits an input CD ROM or compact disc (CD) audio sound recording to be read on reader 14 and recorded on a CD by a recorder 15. The information on the CD may be either a digitized sound recording or computer software. The CD ROM reader 14 and recorder 15 are interconnected by a SCSI bus 13 along with other peripheral devices 16 supported by the SCSI bus structure and protocol. The SCSI bus is connected via an interface 12 to a personal computer 10. The personal computer 10 includes a keyboard 10a and monitor 10b to facilitate operation of the recording process.

Premastering software is available for execution by computer 10 which will read and record any track contained on a CD ROM or CD audio sound recording being read by the reader 14. One such premastering program, previously known as the Corel Creator 2, premastering software package, is now sold as Adaptec Easy CD creator. Under control of computer 10, any of the tracks of the CD ROM being read by the reader 14 can be recorded by the CDR 15.

The present invention provides for a software driver, which may be implemented to inhibit recording by the CDR 15 when a track selected for a recording includes a copyright notice. The copyright notice contained on each track of a CD recording is represented by a flag within a control field of the individual track. The driver, in accordance with the preferred embodiment, includes a preliminary monitoring routine for interrupting the execution of the premastering software at a specific place in the execution process so that an SCSI command cannot be issued to read a track which has been determined to include a copyright notice in the form of the flag in the control field. The preliminary monitoring routine returns execution to the premastering software once it has completed verification that a track which is to be read is not subject to copyright.

Figure 2B:
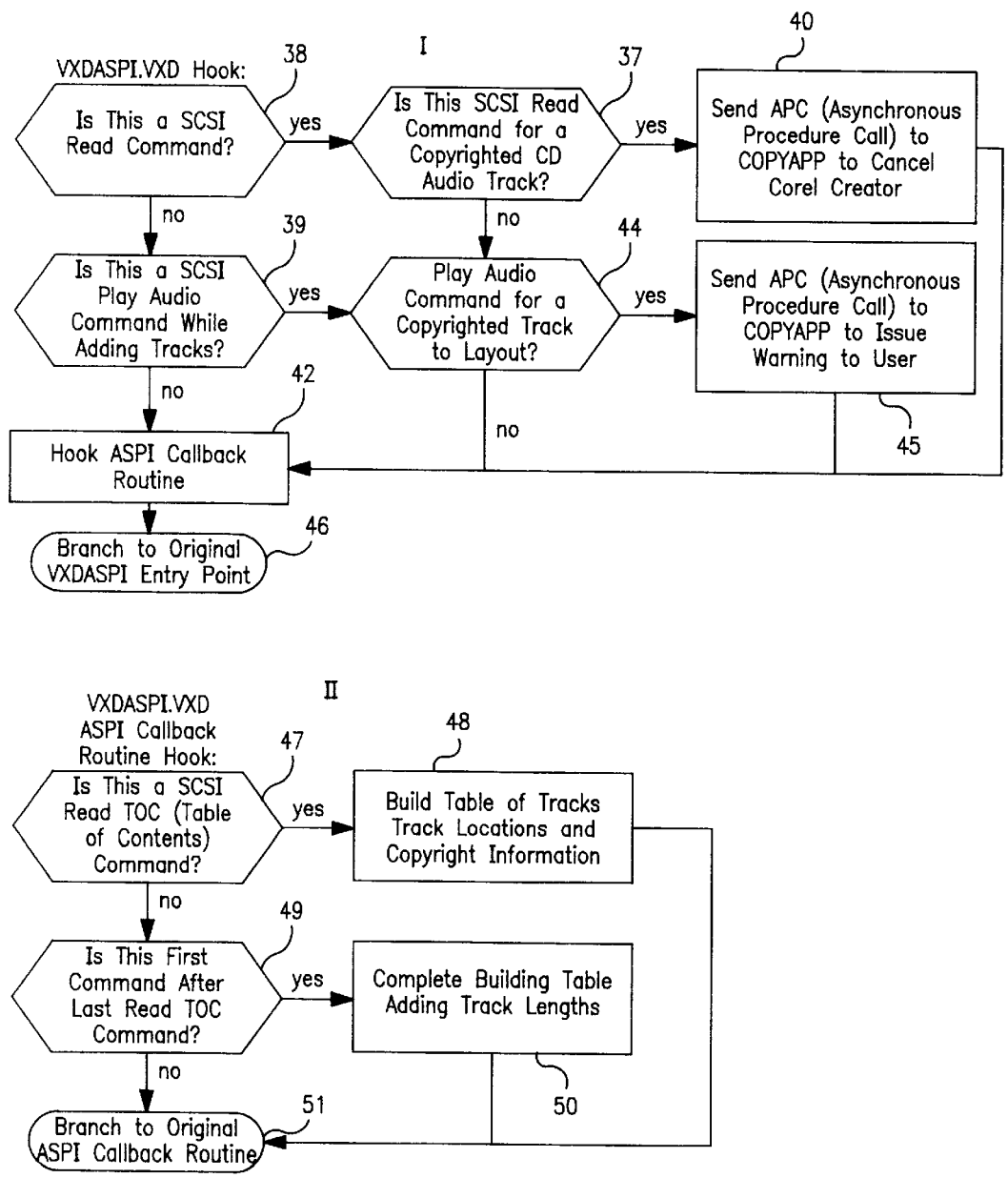

The driver of the preferred embodiment is illustrated in FIG. 2 which intercepts the hardware commands issued by the VXDASPI.VXD driver which is included with the Corel Creator 2 premastering software. The premastering software driver issues SCSI commands, which in the example of FIG. 2, are specific to the Philips CDD2000 CD-Recordable machine. The driver COPYRITE of the preferred embodiment which is loaded by a Windows application program COPYAPP. COPYAPP has two threads, 21 and 22. Thread 21 accepts user inputs. Thread 22 permits APC calls to be made between the COPYAPP program and the driver, COPYRITE.

The device I/O section 25 of the driver application program COPYAPP provides the ability for the Windows application program COPYAPP to communicate with the driver. The application program COPYAPP registers the driver COPYRITE so that messages may be sent in the form of an asynchronous procedure call (APC) to COPYAPP from driver COPYRITE. Following loading of the driver COPYRITE in step 27, a registration process takes place in step 28 by registering the APC with the driver. The driver I/O control section 25 will save the APC routine address that it receives in the registration process in step 29.

The application program COPYAPP includes a user interface 20, and two dialogue functions, warning 32 and warning 33 to the user. Warning 32 is issued when a play audio command has been executed by the driver to read a copyrighted track during a play audio mode. This warning will identify to the user that this track may not be copied. A second warning message is issued in step 33 which is a result of the driver determining that a copyright track has been selected for recording. The message is viewable to the user in step 33, while at the same time the premaster program is inhibited in step 34 from effecting a recording function.

The driver, COPYRITE, has three sections 23, 24 and 25. Section 23 is the system dynamic device initiation section which permits inserting, or "hooking", a preliminary monitoring routine to the entry point in the Corel Creator 2 premastering program driver. Thus, once this entry point is connected, the driver COPYRITE, in accordance with the preferred embodiment, can gain control before any SCSI I/O commands destined for the reader 14 are processed by the premastering program driver VXDASPI.VXD. The system dynamic device exit 24 identified as COPYRITE.VXD will issue an "unhook" to permit the premastering program to resume its normal operation for executing the SCSI I/O commands without passing through the driver COPYRITE of the preferred embodiment when the user enters a terminate command at an input in 20 in thread 21 of the application program.

Once the driver shown in sections I and II has been registered by the Windows program COPYAPP, the Windows COPYAPP program will wait for the driver to issue an APC in step 30. During this time, control of execution will return to Windows and the driver and application program COPYAPP remains running in the background, pending a receipt of an APC. Step 31 terminates the second COPYAPP thread which occurs when the user terminates the program COPYAPP in step 20.

Control over recording is implemented in two subroutines, VXDASPI.VXD Hook I and VXDASPI.VXD ASP Callback Routine Hook II. The first Hook routine of section I will intercept any SCSI read commands at the entry point of the premastering software driver in step 38, and should an SCSI read command be directed to reading a copyrighted CD track as determined in 39, an APC is sent in step 40 to the Windows application program COPYAPP 33 to warn the user that a copyrighted track can not be read, which is followed by a termination command sent in step 34 to the premastering software to abort execution.

The second Hook routine, ASP Callback Routine Hook of section II, is a series of instructions which will build a table of tracks identifying tracks which are to be read, their location, and whether or not a copyright notice in the form of a flag is included in a control field for the track. The entry point for this Hook routine is the ASPI callback routine of the premastering software driver VXDASPI. The information contained in the table is used to identify to step 39 a track which is subject to copyright.

The two routines, VXDASPI.VXD Hook I and VXDASPI.VXD ASP Callback Routine Hook II operate together in intercepting read commands for the SCSI bus. The first driver routine I of FIG. 2 intercepts the entry point of the driver VXDASPI of the premastering program Corel CD Creator. SCSI input/output commands enter the driver section I in step 38. In the event an intercepted command is not an SCSI read command, as determined in step 38, a decision is made in step 39 as to whether it is an SCSI play audio command to be executed while the premastering software is adding tracks as part of a procedure for creating lists of tracks to be read and duplicated. An SCSI play audio command that is generated by the user through a normal CD play mode, would be processed normally.

If the play audio command which is issued by the Corel CD Creator software has been intercepted by the driver of FIG. 2, a determination is made in step 44 whether this is a play audio command for a track which includes copyright notice. If it is, an APC is sent in step 45 to the application program COPYAPP to issue the warning of step 32 that the user has selected a copyrighted track which may not be copied.

In the event this is not a play audio command or a SCSI read command, the second hook is established in 42 to intercept the ASPI Callback Routine entry point of the driver VXDASPI of the Corel CD creator 2, and returns execution to the entry point of the driver VXDASPI in step 46. Once the ASPI Callback Routine has been hooked in step 42, it enters the Callback Routine hook II which is used to build a table of tracks, track locations and copyright information. If the SCSI Read Table of Contents command has been issued by the Corel CD Creator software program, as part of the process of identifying tracks to be recorded in step 47 which always precedes a read command, a table is created in step 48 of all the tracks being read by reader 14 prior to any attempt to read a copyrighted track. The table includes the track, its location and whether or not the copyright notice in the form of a flag is contained within the control field for the track.

Decision block 49 determines whether or not the command being processed is the first command following a read table of contents command. If it is, then the table is further augmented in step 50 by computing the track lengths of each track identified in the Table of Contents.

The program then leaves the ASPI Callback Routine hook in step 51 and enters the original ASPI Callback Routine of the Corel CD Creator premastering software.

Thus, using the forgoing driver, it is possible to intercept read commands to the SCSI bus which read the input CD which is being copied. By building as part of the premastering program a table identifying each copyrighted track, commands by the premastering software to read a track may be successfully intercepted when that track has a copyright notice associated therewith. In this instance, the premastering software is inhibited from reading which prevents recording the identified track, and messages are issued to the user indicating the track cannot be read and copied.

In the event a selected track for recording does not include a copyright flag, then steps 39 and 44 will permit the execution to be resumed by branching back to the entry point of the premastering software driver. Execution of its original program function of copying the contents of a track contained on an input disc in reader 14 to an output disc contained in the CDR 15 may then continue.

As the forgoing example is only illustrative of a way of providing copyright protection to original recording device, it is clear that further measures may be taken to improve the system immunity to unauthorized hacking, or overriding the copyright protection function. These may use standard encryption techniques to make it more difficult to modify the code comprising the driver, as well as using hidden files and possibly fragmenting the driver file for storage in different areas of the computer.

While the foregoing has been described in connection with preventing the unauthorized duplication of a copyrighted track on a CD, it is clear that the process may also be applied to protect copyrightable works which may not be subject of recording, but may be the subject of transmission via modem or other unauthorized reproduction of the copyrighted work.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. An apparatus for monitoring and preventing unauthorized copying of digital data comprising:

a recording device for recording digital data on a first storage medium;

a reading device for reading data from a second storage medium;

a computer connected to said recording device and said reading device over a bus, said computer being programmed to execute premastering instructions to enable reading of data from said second storage medium in order to record said data on said first storage medium, said computer further including instructions for inhibiting copying of said data when said data is subject to copyright comprising:

creating a table of tracks of data stored on said second medium which contains a notice of copyright to tracks of data on said second medium which contains copyrighted subject matter;

determining whether a notice of copyright has been recorded in said table of tracks for a track of data to be recorded; and inhibiting said premastering instructions from reading said data which includes said copyright notice thereby preventing recording of said data on said first medium.

2. The apparatus according to claim 1 wherein said further instructions include reading the contents of said table when said premastering software issues a command to read one of said tracks on said second storage medium.

3. The apparatus according to claim 1 wherein said instructions issue a command to said computer to warn a user that said data is subject to copyright.

4. The apparatus according to claim 1 wherein said copyright notice is identified by a flag included in a control field of a track of stored data.

5. The apparatus according to claim 2 wherein said further instructions comprise a first hook routine which intercepts read commands which are generated by the premastering software, and a second hook routine which creates said table of tracks.

6. An apparatus for monitoring and preventing unauthorized copying of digital data comprising:

a recording device for recording digital data on a first storage medium;

a reading device for reading data from a second storage medium;

a computer connected to said recording device and said reading device over a bus, said computer being programmed to execute premastering instructions to enable reading of data from said second storage medium and to enable recording of said data on said first storage medium, said computer further including instructions for inhibiting copying of said data when said data is subject to copyright comprising:

a driver for controlling execution of commands issued by said premastering software comprising:

a first hook routine for intercepting read commands issued during execution of said premastering instructions, and sending an asynchronous procedure call to cancel said read command if said read command is directed to a copyrighted track; and a second hook routine for creating a table of tracks of data contained in said second storage medium when a read table of contents command is intercepted by said first hook routine, said table of tracks including a flag for indicating a track contains copyrighted material; and an application program for receiving said asynchronous procedure call and inhibiting said premastering software from executing a read command if said read command is directed to said copyrighted track.

7. The apparatus according to claim 6 wherein said first hook routine consults said table of tracks to determine whether said read command is directed to a track of copyrighted data.

8. The apparatus according to claim 6 wherein said first hook routine detects whether a play audio command is issued by said premastering software, and issues an a asynchronous command to issue a warning to a user that is attempting to play a copyrighted track.

9. The apparatus according to claim 8 further comprising a dialogue routine which communicates a warning to a user when said first hook routine issues said asynchronous command.

\* \* \* \* \*